S. V. TENCH.
ATTACHMENT FOR CHAINS.
APPLICATION FILED NOV. 19, 1919.
1,357,262.
Patented Nov. 2, 1920.
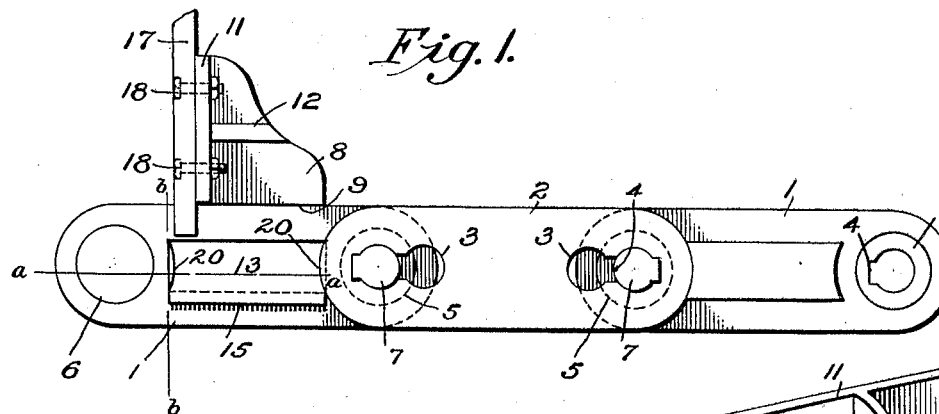
Fig. 1.
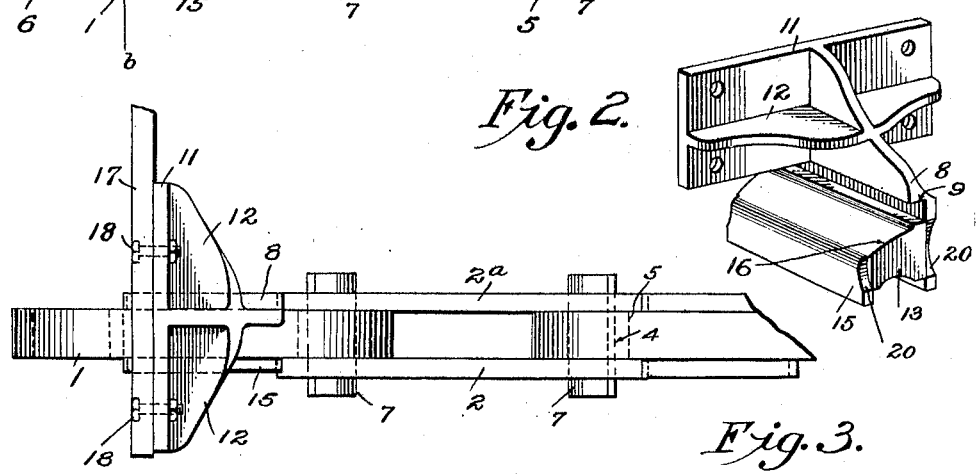
Fig. 2.
Fig. 3.
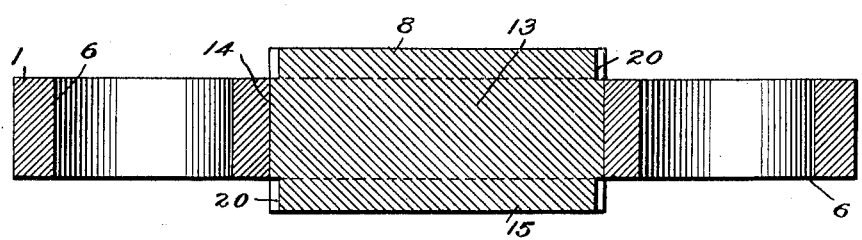
Fig. 4.
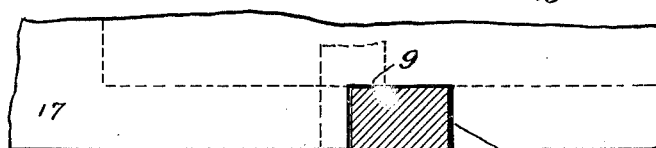
Fig. 5.
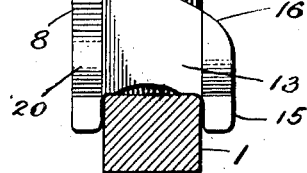
INVENTOR
Samuel V. Tench
BY
Ralph S. Warfield
ATTORNEY

UNITED STATES PATENT OFFICE.

SAMUEL V. TENCH, OF WILKES-BARRE, PENNSYLVANIA.

ATTACHMENT FOR CHAINS.

1,357,262.  Specification of Letters Patent.  Patented Nov. 2, 1920.

Application filed November 19, 1919. Serial No. 339,031.

*To all whom it may concern:*

Be it known that I, SAMUEL V. TENCH, a citizen of the United States, residing in Wilkes-Barre, Luzerne county, Pennsylvania, have invented new and useful Improvements in Attachments for Chains, of which the following is a specification.

More particularly the invention relates to means to connect flights, buckets or other devices to chains.

One object of the present invention is to provide a novel bracket to which the flights, buckets or the like may be secured, which bracket is readily applied to and removed from the chain without the use of bolts or other extraneous fastenings.

The ready detachment and replacement of flight brackets, enables the workman to quickly repair damages to the flights, by substituting new flights or supports, without disassembling or otherwise interfering with the chain itself.

By avoiding the use of bolts or other fastenings to secure the flight brackets in place on the chain, I eliminate the wear which takes place between the bolts and the brackets.

In attaining this object, I provide a support which may be attached to and detached from the chain without the use of tools.

I also provide a bracket or support which grips the chain in such manner as to resist dislodgment or detachment therefrom under pressure from a plurality of directions.

A further object of my invention is the provision of a flight and support so combined that it is readily attached to and detached from the chain, the flight adapted to coact with the chain to lock the support against accidental displacement due to pressure in any direction.

To these and other ends, which will be disclosed hereinafter and particularly pointed out in the claims, my invention includes certain novel features and combinations, as follows—

In the accompanying drawings, Figure 1 is a view in side elevation of a chain, showing one form of my invention applied thereto;

Fig. 2 is a perspective view of the attachment;

Fig. 3 is a plan view of the chain with the attachment;

Fig. 4 is a longitudinal cross-sectional view on line $a$—$a$ of Fig. 1; and

Fig. 5 is a transverse cross section on line $b$—$b$ of Fig. 1.

The particular chain shown in the drawings, forms the subject matter of my copending U. S. application, Serial No. 339,030, filed of even date herewith, it being understood that the present attachment is not confined in its use thereto, but may be applied to other chains on the market.

The chain illustrated, includes a succession of integral and sectional links 1, and 2, $2^a$, arranged alternately, (see Fig. 3), the opposite ends of the sectional links, 2, $2^a$, adapted to embrace the ends of the adjacent integral links 1, and having key hole-shaped slots 3, (Fig. 1), adapted to register with similarly shaped but shorter slots 4 in bushings 5 removably and rotatably mounted in circular eyes 6 formed in the ends of the integral links 1.

A transversely grooved and longitudinally-splined key 7 is insertible through the registered slots 3, 4 to connect the links, the key being then shifted to the outer ends of the slots 3, the walls of which lock the key against endwise displacement, all as more fully explained in the copending application above referred to.

The bracket attachment whereby to equip the chain for operation in the conveyance of coal or other materials from place to place, includes, in the selected embodiment herein disclosed, a support 8 which, in the present instance, comprises a plate, the lower portion of which lies against one side face of one of the integral links 1, the plate extending above one edge of the link and being offset to form a shoulder 9 overlapping and resting upon the upper edge of the link 1.

The forward edge of the upper portion of the support merges into a transverse face plate 11 extending across and resting upon the upper edge of the link 1, the forward surface of the face plate 11 preferably lying in the same vertical plane with the forward edge of the support.

The face plate 11 extends some distance past the opposite side faces of the link and is braced and strengthened by oppositely extending ribs or webs 12 projecting from the sides of the upper portion of the support 8 above the upper edge of the link.

A filler piece 13 projects laterally from the inner face of that portion of the support 8 which lies against the side face of the link 1, and at a point above the lower edge of the support.

The filler piece 13 is adapted to occupy and substantially fill an opening 14 (Fig. 5) which, in the present instance, comprises a slot formed through the link 1 from side to side thereof, and extending longitudinally of the link, the slot being substantially closed at one side by the inner face of the support 8.

A lip 15 depends from the outer free end of the filler member 13 and lies parallel with, and spaced apart from, the inner face of the support below the filler piece, the distance between the inner faces of the support and of the lip being approximately equal to the thickness of the link 1, the lip 15, and filler piece 13 constituting, with the lower portion of the support, a downwardly-opening channel to embrace and grip that portion of the link between the slot 14 and the lower edge of the link.

Furthermore, the upper face of the filler piece 13 and the shoulder 9 coöperate with the inner face of the support between the filler piece and shoulder, to form a laterally-opening channel, the walls of which are adapted to grip that portion of the link between the opening 14 and the upper edge of the link, such angularly arranged channels operating to resist accidental dislodgment of the attachment due to pressure from one side, and the filler piece 13, by occupying the slot 14 from end to end, resisting dislodgment of the attachment due to pressure exerted in either direction longitudinally of the chain.

The lip 15 may be a separate element secured to the free end of the filler piece 13 after the application of the attachment to the chain, but I prefer to construct the support 8, filler piece 13 and lip 15 integrally, in which event, it is advisable to relieve or cut away a portion of the upper face of the filler piece, as indicated at 16 in Fig. 5, to enable the ready insertion and removal of the filler piece 13 and lip 15 through the opening 14.

In such case, the lip and filler piece are inserted and removed by a sort of rocking or swinging movement of the attachment, and it will be observed that, due to the angular relation of the two channels of the support 8, the latter is held in place against dislodgment in all directions save one.

The flights, buckets or other devices 17 extend transversely of the link 1 and lie against the front of the face plate 11 to which they may be secured by bolts or other fastenings 18, and when a pair of chains are employed with the flights extending therebetween, the latter prevent dislodgment or detachment of the supports from their chains in the only direction in which, so far as the explanation has proceeded at this time, there may be a possibility of accidental disengagement.

But to eliminate the chance of accidental displacement due to pressure against the right hand side (Fig. 5) of the attachment when but a single chain is used for a conveyer, I arrange to extend the lower edge of the flight 17 below the upper edge of the link 1, and to notch such lower edge, as shown at 19 in Fig. 5, to embrace and snugly grip the upper edge of the link, thereby firmly locking the attachment in place against accidental displacement in any direction. Of course, a shoulder lying against the right hand face of the link 1 could take the place of the notch 19 to prevent disengagement of the attachment.

The front and rear edges of the support 8 and the lip 15, respectively, lie in line with and in close proximity to the ends of the adjacent sectional links 2, 2ª to prevent the accidental telescoping of the links 1, and 2, 2ª, relatively to one another, such front and rear edges being recessed, as at 20, 20, to conform to the curved ends of the sectional links, and permit one link to be swung at approximately right angles to its adjacent link, when it is desired to disconnect the links for repairs or substitutions.

Throughout the foregoing specification, the terms "top" and "bottom," "front" and "rear," "upper" and "lower," "above" and "below" have been employed in the explanation of the invention, in connection with the drawings, and in the claims to conveniently bring out the details of construction, but it will be understood that the use of these terms in no way limits the invention to the exact form shown.

It will be observed that my attachment is readily applied to and removed from the chain without disconnecting the latter, and without the use of tools, thereby permitting a quick and easy substitution of new, for broken, attachments, and also, that, with the exception of the fastenings which secure the flights 17 or similar devices (old in the art) to the face plates 11, no extraneous fastenings are employed to secure the attachment to the link, and hence I eliminate the wear which often occurs between the fastenings and the attachment.

Changes may be made in the form and arrangement of the several parts set forth, without departing from the spirit of the invention and the scope of the following claims.

What I claim as new, is—

1. The combination with a chain, including a link having an opening therethrough; of an attachment to which flights, conveyer buckets and the like, may be secured, the attachment including a support extending along one side of the link and having a filler piece entered in the opening in the link, the filler piece having channels arranged at an angle to each other to releasably grip the upper and lower portions of the link on opposite sides of the opening.

2. The combination with a chain, including a link having an opening therethrough; of an attachment removably mounted on the link, and including a support having angularly-arranged channels, the walls of one of which channels embrace the opposite sides of that portion of the link on one side of the opening, and the walls of the other of which channels embrace the upper and lower edges of that portion of the link on the opposite side of the opening.

3. The combination with a chain, including a link having an opening therethrough; of an attachment removably mounted on the link, and including a support having channels arranged angularly relative to each other and adapted to respectively embrace the upper and lower faces of that portion of the link on one side of the opening, and the inner and outer faces of that portion of the link on the other side of the opening, whereby to resist dislodgment from the link in a plurality of directions; and a flight or similar device secured to the support.

4. The combination with a chain, including a link having an opening therethrough; of an attachment removably mounted on the link, and including a support having channels arranged angularly relative to each other and adapted respectively to embrace the upper and lower faces of that portion of the link on one side of the opening, and the inner and outer faces of that portion of the link on the other side of the opening, whereby to resist dislodgment from the link in a plurality of directions; and a flight or similar device secured to the support, the lower edge of the flight being notched to embrace the upper edge of the link.

5. The combination with a chain, including a link having an opening therethrough; of an attachment to which flights, buckets and the like may be secured, such attachment being removably mounted on the link, and including a support extending along one side of the link to obstruct the opening, the support having a laterally-projecting filler piece insertible in the opening, and equipped with a lip to overlap the opposite side of the link, whereby the latter is clasped between the lip and the support.

6. The combination with a chain, including a link having an opening therethrough; of an attachment removably mounted on the link, and including a support extending along one side of the link to obstruct the opening, the support having a laterally-projecting filler piece insertible in the opening, the filler piece projecting from the inner face of the support at a point above the lower edge of the support, and having one face relieved to afford a clearance between the filler piece and one wall of the opening; and a lip secured to the outer edge of the filler piece to overlap the opposite side of the link, whereby the latter is clasped between the lip and support.

7. The combination with a chain, including a link having an opening therethrough; of an attachment removably mounted on the link, and including a support extending along one side of the link to obstruct the opening, the support having a laterally-projecting filler piece insertible in the opening, and having one face relieved to afford a clearance between the filler piece and one wall of the opening, as the piece is inserted and removed; and a lip secured to the outer edge of the filler piece and adapted to overlap that side of the link opposite the side against which the support lies.

8. The combination with a chain, including a link having an opening therethrough; of an attachment removably mounted on the link, and including a support extending along one side of the link and over the opening, the support having a laterally-extending filler piece insertible in the opening, and equipped with a lip at its outer end to overlap that side of the link opposite the side against which the support lies; and a flight attached to the support and extending transversely of the link, the flight having a notch to embrace the adjacent edge of the link.

9. The combination with a chain, including a link having an opening therethrough; of an attachment removably mounted on the link, and including a support extending along one side of the link and over the opening, the support having a laterally-extending filler piece insertible in the opening; and a flight attached to the support and extending transversely of the link, the flight having a notch to embrace the adjacent edge of the link.

10. The combination with a chain, including a link, of an attachment removably connected to the link; and a flight or similar device secured to the attachment and extending transversely of the link, the flight being notched to fit over the adjacent edge of the link.

11. The combination with a chain, including a link; of an attachment removably mounted on the link, and including a support lying against one side of the link, and extending past one edge thereof, the extended portion of the support being offset relatively to the portion lying against the side of the link, to form a shoulder to rest on the outer edge of the link; means to releasably connect the support and the link; a face plate attached to the support and extending transversely of the link; and a flight or similar device secured to the face plate.

12. The combination with a chain, including a link; of an attachment removably mounted on the link, and including a support lying against one side of the link, and extending past one edge thereof, the extended portion of the support being offset relatively to the portion lying against the side of the link, to form a shoulder to rest on the outer edge of the link; means to releasably connect the support and the link; a face plate attached to the support and extending transversely of the link; and a flight or similar device secured to the face plate, the flight extending across the link and being notched to embrace the adjacent edge of the link.

13. The combination with a chain, including a link having an opening therethrough; of an attachment removably applicable to the link, including a support lying against one side of the link, and extending past one edge thereof, the extended portion being offset to form a shoulder to rest on the adjacent edge of the link; a filler piece extending laterally from the inner face of the support and insertible in the opening in the link; a lip on the free end of the filler piece to overlap the opposite side of the link, the outer face of the filler piece coacting with the shoulder to clasp the intervening portion of the link; and a flight or similar device secured to the support.

14. The combination with a chain, including a series of links, having pin and slot connections, one of the links having an opening therethrough; of an attachment removably applicable to the apertured link, including a support lying against one face of the link; a filler piece extending laterally from the inner face of the support, and insertible in the opening in the link; a lip on the free end of the filler piece, lying against the opposite side of the link; the ends of the lip and of the support being recessed to clear the end edges of the adjacent links and prevent accidental disconnection of the links through telescoping; and a flight or similar device secured to the support.

15. The combination with a chain, including a link having a longitudinally extending slot therethrough; of an attachment removably mounted on the link, including a support lying against one side of the link, and having a shoulder seated upon the outer edge of the link; a filler piece projecting laterally from the inner face of the support at such a point that the distance between the upper edge of the filler piece and the shoulder approximates the distance between the outer edge of the link and the adjacent wall of the longitudinally extending opening, such intervening portion of the link adapted to be gripped between the shoulder and filler piece; a lip depending from the free end of the filler piece to lie against the opposite side of the link, whereby to form, with the lower face of the filler piece and the inner face of the support, a channeled clamp to snugly embrace that portion of the link between the longitudinal slot and the inner edge of the link, when the filler piece is inserted through the slot in the link.

16. The combination with a chain, including a link having a longitudinally extending slot therethrough; of an attachment removably mounted on the link, including a support lying against one side of the link, and having a shoulder seated upon the outer edge of the link; a filler piece projecting laterally from the inner face of the support at such a point that the distance between the upper edge of the filler piece and the shoulder approximates the distance between the outer edge of the link and the adjacent wall of the longitudinally extending opening, such intervening portion of the link adapted to be gripped between the shoulder and the filler piece; a lip depending from the free end of the filler piece to lie against the opposite side of the link, whereby to form, with the lower face of the filler piece and the inner face of the support, a channeled clamp to snugly embrace that portion of the link between the longitudinal slot and the inner edge of the link, when the filler piece is inserted through the slot in the link, a part of the upper face of the filler piece being cut away to afford a clearance as the filler piece is tilted during its insertion into the slot.

17. The combination with a link having an opening therein; of an attachment, including a channeled support coacting with the opening in the link to snugly grip the link; a face plate carried by the supports and extending transversely relatively to the support across the link; and a flight secured to the face plate, the lower edge of the flight being recessed to fit over the upper edge of the link.

18. The combination with a link having an opening therethrough; of an attachment, including a support applied to one side of the link across the opening; a filler piece projecting laterally from the inner face of the support, the filler piece extending through the opening in the link and substantially filling the same; a lip depending from the free end of the filler piece, the distance between the inner faces of the lip and support being approximately equal to the thickness of the link, to snugly grip that portion of the link between the opening and the inner edge of the link.

19. In a chain, the combination with a link, having an opening formed transversely therethrough from side to side; of a means for removably attaching flights to the link, including a support arranged longitudinally of the link and having a shoulder to seat on the outer edge of the link, the support lying along one side of the link intermediate its ends; a filler piece projecting laterally from the inner face of the support intermediate the shoulder and the free edge of the support, the filler piece being approximately as long as the opening in the link, into which it fits; a lip on the free end of the filler piece, the inner face of which lip contacts that side of the link opposite the support to coact with the support and snugly grip the opposite sides of the link, the upper face of the filler piece and the shoulder adapted to contact the outer edge of the link and the adjacent wall of the opening, respectively; and a flight secured to the support, the lower edge of the flight being notched to grip the adjacent edge of the link.

20. The combination with a conveyer chain, of a means for attaching flights thereto, including a support secured to the chain; a face plate carried by the support and extending transversely of the chain; and a flight secured to the bracket and likewise extending transversely of the chain, the lower edge of the flight being notched to accommodate and grip the upper edge of the chain link by which the attachment is borne.

SAMUEL V. TENCH.